Figure 1:
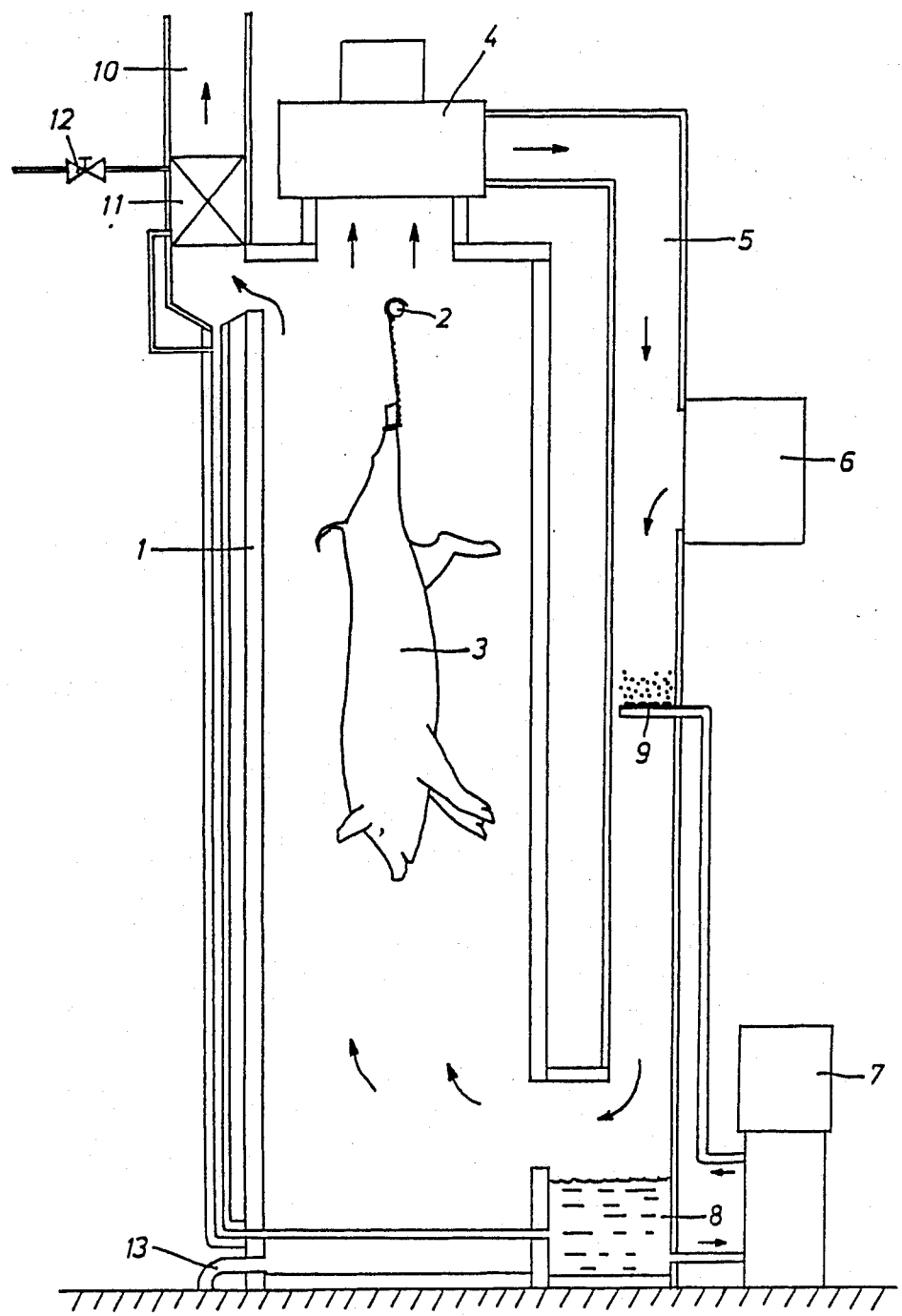

United States Patent [19]

Thorsen

[11] Patent Number: 4,731,908
[45] Date of Patent: Mar. 22, 1988

[54] APPARATUS FOR THE SCALDING OF CARCASSES

[75] Inventor: Olaf Thorsen, Olstykke, Denmark

[73] Assignee: Slagteriernes Forskningsinstitut, Roskilde, Denmark

[21] Appl. No.: 7,966

[22] PCT Filed: Apr. 11, 1986

[86] PCT No.: PCT/DK86/00038
 § 371 Date: Dec. 12, 1986
 § 102(e) Date: Dec. 12, 1986

[87] PCT Pub. No.: WO86/05952
 PCT Pub. Date: Oct. 23, 1986

[30] Foreign Application Priority Data

Apr. 12, 1985 [DK] Denmark .............................. 1643/85

[51] Int. Cl.$^4$ ............................................... A22B 5/08
[52] U.S. Cl. ...................................................... 17/15
[58] Field of Search ................. 17/47, 14, 15, 11.2, 17/51

[56] References Cited
U.S. PATENT DOCUMENTS

| | | | |
|---|---|---|---|
| 3,115,671 | 12/1963 | Wilcox | 17/47 |
| 3,320,632 | 5/1967 | Oehring | 17/15 X |
| 3,343,477 | 9/1967 | Ekstam | 17/14 X |
| 3,520,011 | 7/1970 | Lehman et al. | 17/47 X |
| 3,703,021 | 11/1972 | Sharp | 17/47 |

Primary Examiner—Willie G. Abercrombie
Attorney, Agent, or Firm—Fleit, Jacobson, Cohn & Price

[57] ABSTRACT

An apparatus for the scalding of carcasses comprises a heat insulated cabin (1) for the carcasses (3) and fans (4) with appertaining air ducts (5) for the circulation of hot, humid air past the carcasses being conveyed through the cabin. Fan supported burners (6) and water atomizers (9) opening directly into the air ducts are provided for maintaining the temperature and humidity of the circulating air. The output of the burners (6) is adjusted directly by temperature sensors placed in the circulating air, while the water atomizers (9) are set for a constant output. The adjustment can adapt itself quickly to changing load conditions so that a constant condition is maintained in the cabin. The apparatus has also one or more air discharge ducts (10) for the air supplied to the cabin by the burners (6).

11 Claims, 3 Drawing Figures

APPARATUS FOR THE SCALDING OF CARCASSES

The present invention relates to an apparatus for the scalding of carcasses comprising a heat insulated cabin for the carcasses and fans with appertaining air ducts for the circulation of hot, humid air past the carcasses which are conveyed through the cabin.

In bacon factories the carcasses are exposed to hot water or a hot, humid air current for a suitable period until dead surface layers and bristles have loosened. The parts can then be removed in a machine by means of rotary beating straps.

When scalded by a hot air current, the carcasses are conveyed through a cabin in which a vertical air current with a high humidity and a temperature of 60°–70° C. is provided. The aqueous vapour in the air is condensed as water droplets on the rind surface of the carcasses, and heat is thus supplied to the rind. After 6–10 minutes of treatment the surface layer and bristles of the carcass have loosened sufficiently to be removed in a machine.

In order to ensure uniform scalding of the rind surface it is necessary to maintain the temperature and humidity of the circulating air.

In a prior art apparatus steam is blown into the circulating air, and immediately thereafter the air is passed along cooling elements whereby the surplus humidity in the air is condensated into floating water droplets. The carcasses are thus scalded in a mist of hot water particles. The apparatus requires much energy because large amounts of heat are lost through the cooling elements.

Another prior art apparatus uses electric heaters together with steam to maintain a fixed temperature and air humidity, e.g. 85–95% relative humidity. A humidity sensor and a temperature sensor control the electric heaters and the steam supply. The steam consumption is thus reduced but at the same time electric power is required which normally is more expensive than fuel used in steam generators.

Owing to the fact that the loading of the cabin is constantly changing it has also appeared to be difficult to obtain a satisfactory joint control of both temperature and humidity.

The present invention provides a scalding apparatus without the abovementioned disadvantages. The apparatus according to the invention is characterized in that it comprises burners and water atomizers opening directly into air ducts, and one or more air discharge ducts for the air supplied to the cabin by the burners.

The apparatus according to the invention is advantageous in that only one heat source is used which supplies the necessary amount of heat directly, neither more nor less. The heat is utilized directly for production of vapour and heating of the circulating air, which means that the heat source is very cheap in operation.

By adjusting the burner output it is also possible to keep both temperature and air humidity constant which results in a very simple control.

In compliance with the invention, temperature sensors may thus be placed in the circulating air having connected control units for direct regulation of the burner output maintaining a constant condition in the cabin.

According to the invention the water atomizers may comprise atomizing nozzles and water pumps connected hereto, particularly with a constant output.

In order to collect and re-use surplus water from the water atomizers according to the invention a basin may be placed under the atomizing nozzles in the air ducts, and the suction side of the water pumps may be connected to this basin.

The air discharge ducts of the apparatus according to the invention may be equipped with air/water heat exchangers, the water outlets of which are connected to the suction side of the water pumps. In this way the heat in the discharge gas may be used for preheating of the water which is supplied to the pumps.

The apparatus according to the invention may be supplied with one or more belt conveyor systems conveying lying carcasses through the cabin. This embodiment has the advantage of not discolouring the rind as is the case with scalding of suspended carcasses.

In order to produce a uniform scalding the belts of the system may be designed with a considerable perforated area enabling the passage of humid air at right angles to the belt planes. The belts may be in the form of nets easily penetrated by the humid air.

The apparatus according to the invention may comprise a sliding bar along which suspended carcasses are conveyed in the cabin. The result is a simpler construction and maintenance than with the above-mentioned belt conveyor system.

The invention is described in more detail in the following, with reference to the drawings which show a section through three different embodiments of a scalding apparatus for pig and sow carcasses.

Figure 2:
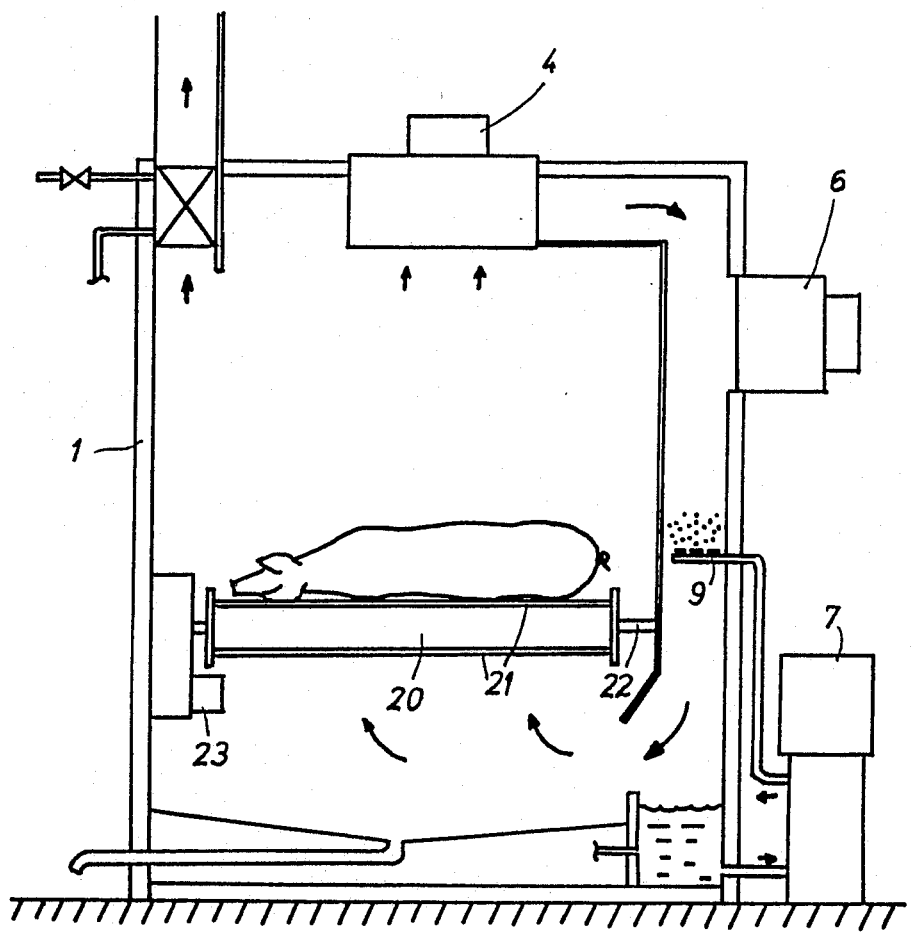
Figure 3:
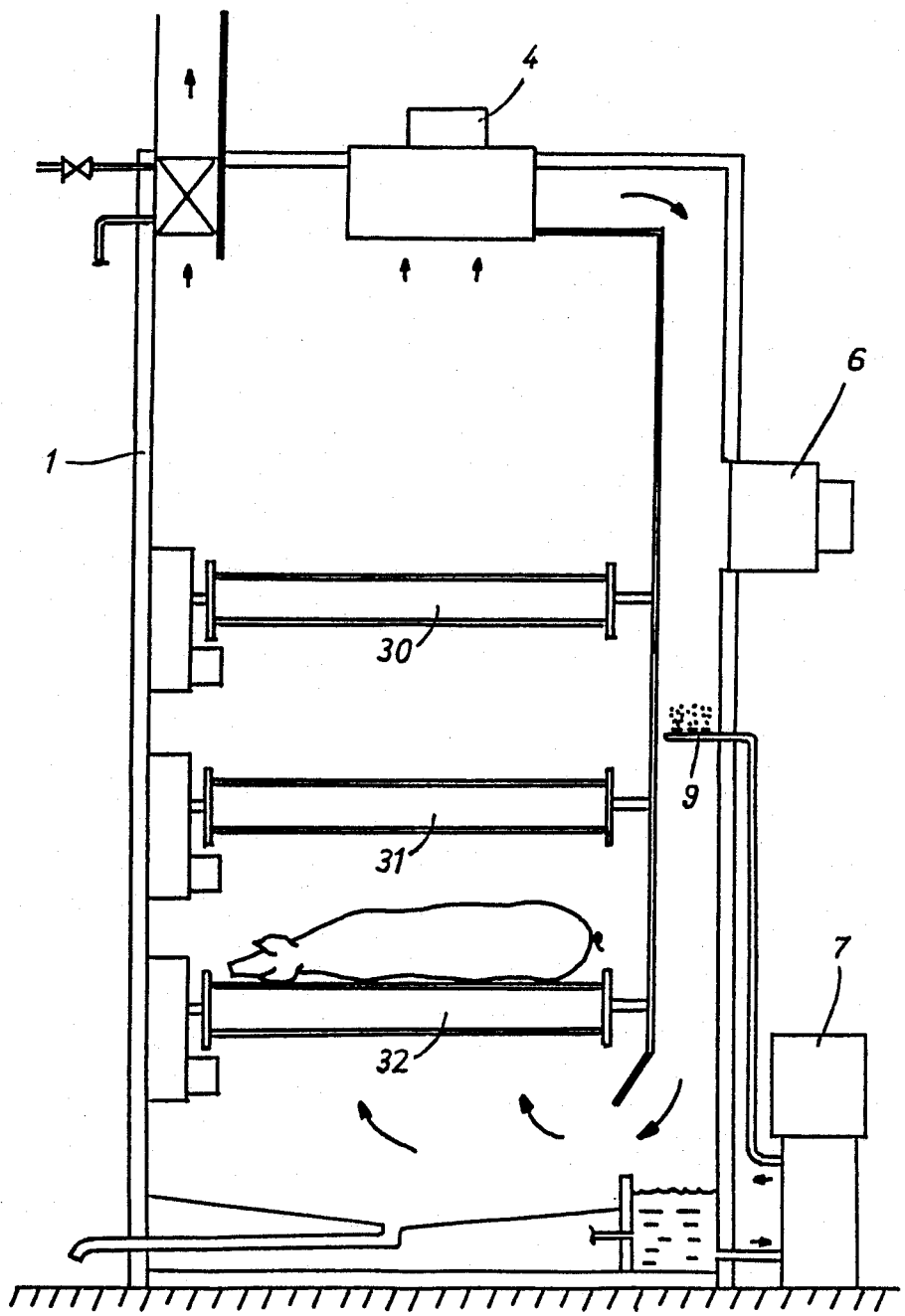

FIG. 1 shows a scalding cabin with a suspended carcass conveyed on a sliding bar, FIG. 2 a cabin with a lying carcass conveyed on a belt, and FIG. 3 a corresponding cabin, but with three belts for conveying the carcasses.

The embodiment of the apparatus shown in FIG. 1 is designed for the scalding of approx. 160 carcasses per hour. It comprises a cabin 1, approx. 15 meters long with heat insulated walls. A sliding bar 2 extends through the cabin along which suspended carcasses 3 are conveyed by drivers not shown. A number of air circulation systems is installed at intervals of approx. three meters seen in the longitudinal direction of the cabin.

Each system consists of a fan 4 and an air duct 5 which guides the air from the fan outlet to an opening at the bottom of cabin 1. An opening in the wall of the air duct accommodates a burner 6 with a fan in such a way that the combustion gas is supplied to the duct 5. A gas or oil burner is used. An air temperature sensor is fitted in the interior of cabin 1 to regulate the burner output via a control system.

A water pump 7 sucks water through a basin 8 at the bottom of the duct 5 and pumps it through atomizing nozzles 9 placed in the centre of the duct. The nozzles 9 and the pumps 7 are so dimensioned that there will be a surplus of atomized water even at maximum outputs of the burners.

At the top of cabin 1 air discharge ducts 10 are located which are equipped with air/water heat exchangers 11. Demineralized water may be supplied to the water side of each heat exchanger through a valve 12 which is controlled by a level sensor in the basin 8. The water preheated in the heat exchanger flows together with the condensate drops of the heat exchanger through a tube to the basin 8 which supplies the water pump 7.

The cabin bottom holds a drain 13 for the removal of condensate dripping from the suspended carcasses 3.

The apparatus works as follows:

Pig carcasses are moved along the sliding bar 2 and enter the cabin 1 through an air lock which keeps the hot, humid circulating air inside the cabin. The air sweeps up along the sides of the carcasses which are cooled to such an extent that condensate is formed on the rind surface which is gradually scalded during the passage of the carcasses through the cabin.

The cooled and dehumidified air sucked away by the fans 4 is heated and re-humidified in the ducts 5 by means of the burners 6 and the nozzles 9. The output of each burner is regulated automatically by means of the temperature sensor, so that the air sweeping alongside the carcasses maintains a constant condition, e.g. a temperature of 67° C. and a relative humidity of 95-100%.

The air temperature may be controlled in each circulation system independently of the temperatures in the adjacent circulation system, for example so that a higher temperature is maintained in the cabin inlet than in the outlet.

The embodiment shown in FIG. 2 is designed in a way similar to that used in the apparatus shown in FIG. 1, but instead of the sliding bar 2 it has a belt system 20 for conveying the carcasses in the scalding cabin. The belt system consists of a metal net 21 supported and moved by rollers whose axles 22 rest in bearings at both ends. The axles are driven by motor units 23 at such a speed that it takes approx. 7 minutes for a carcass placed on the belt 21 at one end of the cabin to reach the opposite end of the cabin in the scalded state.

As in FIG. 1, reference figures 4, 6, 7 and 9 designate a fan, a gas burner, a water pump, and a water atomizer.

The embodiment shown in FIG. 3 is designed in a way similar to that used in the apparatus of FIG. 2, but comprises three belt systems 30, 31, 32 instead of one. The length of the apparatus is approx. 10 meters and it is capable of scalding 320 carcasses per hour. The belt systems are interconnected enabling each carcass to follow a S-shaped path when being conveyed from the inlet of the upper system 30 via system 31 to the outlet of the lower system.

The folding of the conveyor path means that the cabin is considerably shorter and more economical as regards heat consumption than the cabin type shown in FIG. 2. As in FIGS. 1 and 2 the reference figures 4, 6, 7 and 9 designate a fan, a gas burner, a water pump and a water atomizer. They are used and regulated in the same way in all the three embodiments.

Because of the simple regulation obtained by the thermostatically controlled burner the carcasses will be swept constantly by air of correct temperature and humidity. The burners are stepped down automatically when the cabin is empty because it is only necessary to compensate for the heat loss through the walls of the cabin. As soon as the cabin is loaded with carcasses the cabin air is immediately supplied with sufficient heat and humidity through increased burner outputs controlled directly by the temperature sensors.

I claim:

1. An apparatus for the scalding of carcasses comprising:
    heat insulated cabin means for housing the carcasses;
    fan means for moving hot humid air through said cabin means;
    water atomizer means for providing atomized water to said cabin;
    burner means for heating the atomized water and air; and
    air discharge duct means for discharging air supplied to said cabin.

2. The apparatus according to claim 1 further comprising air duct means for directing the hot humid air through said cabin means, said air duct means communicating with said fan means, said burner means and said water atomizer means.

3. The apparatus according to claim 1, further comprising temperature sensor means for regulating the output of said burner means.

4. The apparatus according to claim 2, wherein the water atomizer means comprising atomizing nozzles and water pumps connected thereto.

5. The apparatus according to claim 4, further comprising basin means for collecting water, said basin means being placed under the atomizing nozzles in the air ducts, and said basin means being connected to the suction side of the water pumps.

6. The apparatus according to claim 4, wherein said air discharge duct means are equipped with air/water heat exchangers having water outlets, and wherein said water outlets are connected to the suction side of the water pumps.

7. The apparatus according to claim 1, further comprising belt conveyor means for carrying lying carcasses through the cabin.

8. The apparatus according to claim 7, wherein the belts of said belt conveyor means further comprise perforated means for enabling passage of humid air at right angles to the planes of the belts.

9. The apparatus according to claim 8, wherein said belts are nets.

10. The apparatus according to claim 1, further comprising sliding bar means for conveying suspended carcasses through the cabin.

11. An apparatus according to claim 1, wherein said burner means is selected from the group consisting of gas and oil burners.

* * * * *